US007034900B2

(12) United States Patent
Yoshizawa et al.

(10) Patent No.: US 7,034,900 B2
(45) Date of Patent: Apr. 25, 2006

(54) COLOR DISPLAY DEVICE AND METHOD UTILIZING CONVERGENCE CORRECTION

(75) Inventors: Kazuhiko Yoshizawa, Tokyo (JP); Toshimitsu Watanabe, Tokyo (JP); Kuninori Matsumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 498 days.

(21) Appl. No.: 10/029,665

(22) Filed: Dec. 21, 2001

(65) Prior Publication Data

US 2002/0196379 A1    Dec. 26, 2002

(30) Foreign Application Priority Data

Jun. 25, 2001    (JP)    ............... 2001-190591

(51) Int. Cl.
H04N 3/22      (2006.01)
H04N 3/26      (2006.01)
H04N 3/223     (2006.01)
H04N 3/227     (2006.01)
H04N 9/28      (2006.01)

(52) U.S. Cl. ............... 348/807; 348/745; 348/747; 315/368.11; 315/368.13

(58) Field of Classification Search ............... 348/745, 348/747, 750, 807–808; 315/368.11–368.13; 382/264; H04N 3/22, 3/26
See application file for complete search history.

(56) References Cited

U.S. PATENT DOCUMENTS

| | | | | |
|---|---|---|---|---|
| 4,754,204 A | * | 6/1988 | Ando et al. .................. 315/367 |
| 5,111,284 A | * | 5/1992 | Tsujihara et al. ............ 348/747 |
| 5,161,002 A | * | 11/1992 | Rodriguez-Cavazos et al. .......................... 348/445 |
| 5,200,815 A | * | 4/1993 | Tsujihara et al. ............ 348/181 |
| 5,216,497 A | * | 6/1993 | Tsujihara et al. ............ 348/745 |
| 5,298,985 A | * | 3/1994 | Tsujihara et al. ............ 348/745 |
| 5,627,605 A | * | 5/1997 | Kim ........................... 348/745 |
| 5,734,233 A | * | 3/1998 | Masumoto et al. ..... 315/368.12 |
| 5,793,447 A | * | 8/1998 | Fujiwara et al. ............ 348/807 |
| 5,963,274 A | * | 10/1999 | Youn .......................... 348/745 |
| 5,969,655 A | * | 10/1999 | Imai ........................... 341/144 |
| 6,008,596 A | * | 12/1999 | Ara ........................ 315/368.11 |
| 6,034,742 A | * | 3/2000 | Kimoto et al. ............... 348/625 |
| 6,108,054 A | * | 8/2000 | Heizmann et al. ........... 348/745 |
| 6,148,112 A | * | 11/2000 | Chujo ......................... 382/254 |
| 6,753,932 B1 | * | 6/2004 | Ishii et al. ................... 348/807 |
| 6,924,816 B1 | * | 8/2005 | Deering ....................... 345/589 |
| 6,940,529 B1 | * | 9/2005 | Deering ....................... 345/647 |

FOREIGN PATENT DOCUMENTS

JP         60-185482        9/1985

* cited by examiner

Primary Examiner—Brian P Yenke
(74) Attorney, Agent, or Firm—Townsend and Townsend and Crew LLP

(57) ABSTRACT

In a color display device, apparatus and method are provided to produce a convergence correction signal based on digital convergence correction values. The data rate by which the data is supplied to the apparatus varies, depending on the area of the display corresponding to the digital convergence correction values being supplied.

4 Claims, 7 Drawing Sheets

FIG.3

| Address | |
|---|---|
| 00h | Convergence correction data storage area at interpolation point 0 |
| 01h | Convergence correction data storage area at second adjusting point A |
| 02h | Convergence correction data storage area at first adjusting point 1 |
| 03h | |
| 04h | Convergence correction data storage area at first adjusting point 2 |
| 05h | |
| 06h | Convergence correction data storage area at first adjusting point 3 |
| 07h | |
| 08h | Convergence correction data storage area at first adjusting point 4 |
| 09h | |
| 0Ah | Convergence correction data storage area at first adjusting point 5 |
| 0Bh | |
| 0Ch | Convergence correction data storage area at first adjusting point 6 |
| 0Dh | |
| 0Eh | Convergence correction data storage area at first adjusting point 7 |
| 0Fh | |
| 10h | Convergence correction data storage area at first adjusting point 8 |
| 11h | |
| 12h | Convergence correction data storage area at first adjusting point 9 |
| 13h | |
| 14h | Convergence correction data storage area at first adjusting point 10 |
| 15h | |
| 16h | Convergence correction data storage area at first adjusting point 11 |
| 17h | |
| 18h | Convergence correction data storage area at first adjusting point 12 |
| 19h | |
| 1Ah | Convergence correction data storage area at first adjusting point 13 |
| 1Bh | Convergence correction data storage area at second adjusting point B |
| 1Ch | Convergence correction data storage area at interpolation point 14 |
| 1Dh | |
| 1Eh | Convergence correction data storage area at interpolation point 15 |
| 1Fh | |

FIG.4

| Address | |
|---|---|
| 00h | Convergence correction data storage area at interpolation point 0 |
| 01h | Convergence correction data storage area at first adjusting point 1 |
| 02h | Convergence correction data storage area at first adjusting point 2 |
| 03h | Convergence correction data storage area at first adjusting point 3 |
| 04h | Convergence correction data storage area at first adjusting point 4 |
| 05h | Convergence correction data storage area at first adjusting point 5 |
| 06h | Convergence correction data storage area at first adjusting point 6 |
| 07h | Convergence correction data storage area at first adjusting point 7 |
| 08h | Convergence correction data storage area at first adjusting point 8 |
| 09h | Convergence correction data storage area at first adjusting point 9 |
| 0Ah | Convergence correction data storage area at first adjusting point 10 |
| 0Bh | Convergence correction data storage area at first adjusting point 11 |
| 0Ch | Convergence correction data storage area at first adjusting point 12 |
| 0Dh | Convergence correction data storage area at first adjusting point 13 |
| 0Eh | Convergence correction data storage area at interpolation point 14 |
| 0Fh | Convergence correction data storage area at interpolation point 15 |
| 10h | Convergence correction data storage area at second adjusting point A |
| 11h | Convergence correction data storage area at second adjusting point B |

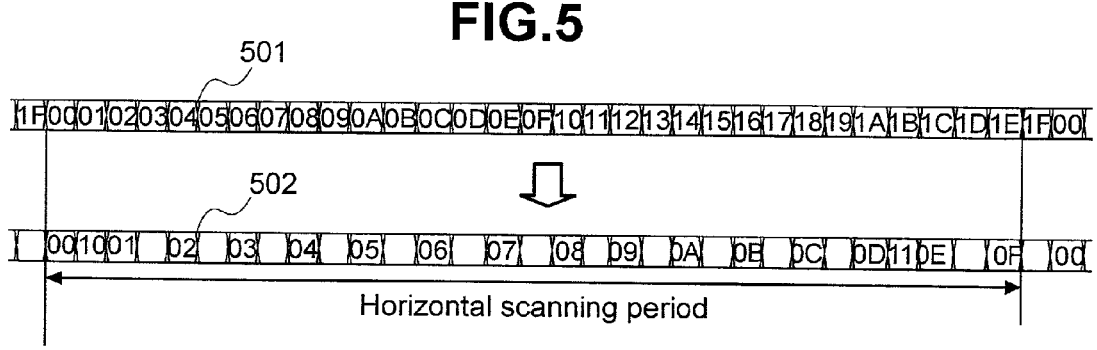

FIG.5

COLOR DISPLAY DEVICE AND METHOD UTILIZING CONVERGENCE CORRECTION

This application is related to and claims priority from Japanese Patent Application No. 2001-190591, filed on Jun. 25, 2001.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention relates generally to a color display. More specifically, the invention is directed to a digital convergence apparatus for use in color projection-type television display systems.

As a prior art related to improvement in accuracy of convergence correction around the perimeter of a screen, for example, that described in Japanese Patent Laid-open No. Sho 60-185482 is known. This prior art is devised as follows: in a device that stores correction data corresponding to correction points, which are placed inside the displayed portion (herein referred to as the "display range") of a horizontal scan line and outside the display range (namely, the non-viewable blanking periods of the horizontal scan line adjacent to the viewable portion), in a memory, and that converts the correction data into analog quantitative data, and that generates a correction waveform of convergence through a low-pass filter (LPF), a cross-hatching pattern, in which an interval between vertical lines in the perimeter of the screen (both right and left edges) becomes closer than that in a central portion of the screen, is displayed on the screen; and extrapolation operation of correction data corresponding to the correction points outside the screen is performed using the convergence correction data that has been manually corrected while watching the vertical lines displayed on both of the right and left edges.

In the above-mentioned prior art, a vertical line of the cross-hatching pattern is added to both of the right and left edges of the screen one by one, and the convergence correction at both of the right and left edges of the screen is performed with reference to the lines. Because of it, the convergence correction in both of the right and left edges of the screen becomes easy. However, if a difference between correction data corresponding to the correction point outside the screen and correction data corresponding to its adjacent correction point inside the screen is large, a correction waveform obtained through the LPF may differ from desired one (to be more specific, a level of the correction waveform corresponding to a certain correction point does not correspond with the correction data of the correction point). For example, the following problem arises: influence of the correction data outside the screen causes a correction waveform in proximity to a starting position of the display range to become smaller than correction data in proximity to its position, resulting in decrease of accuracy of the convergence correction around the perimeter of the screen.

The decrease in accuracy of the convergence correction around the perimeter of the screen is remarkable when performing the convergence correction of a high-definition video signal such as that used in high-definition television broadcasts. This will be described with reference to FIGS. 9 and 10 below.

In general, as shown in FIG. 9, a digital convergence correction circuit, which supports a NTSC video signal, is configured in the following manner: the total number of correction points placed in one horizontal scan line is about 16 (n=16); and the number of correction points in the display range (90% of an effective display range) is about 13 (m=13, m is an integer and m<n). On the other hand, concerning a high-definition video signal such as that used in high-definition television broadcasts, a blanking period is shorter than that of a NTSC video signal (more specifically, an effective display range is wide). Therefore, if the numbers of the correction points for a high-definition video signal are configured to be the same as those for the NTSC video signal (that is to say, n=16 and m=13), as shown in FIG. 10, periods 1001 at right and left edges of the screen are significantly shifted from a range within which the convergence correction data can be set by the manual adjustment. Therefore, there is a possibility of decreasing accuracy of the convergence correction in proximity to the perimeter of the screen.

In order to improve the accuracy of the convergence correction in proximity to the perimeter of the screen, the following method can be considered: the number of the correction points in proximity to a boundary between the display range and the blanking period is increased by increasing the values of n and m, for example, by doubling the values (n=32, m=27). However, if the number of n is doubled, labor at the time of the manual adjustment, the required size of a circuit, and memory capacity will increase greatly, which is not desirable.

In view of the foregoing, the present invention has been made, and with the desire to provide a projection-type television receiver in which accuracy of convergence correction at right and left edges of a screen is improved without greatly increasing the number of correction points.

SUMMARY OF THE INVENTION

In accordance with the invention, a color display device includes a convergence apparatus having digital convergence correction data. The data are converted to an analog signal which is used as a convergence correction signal. In one aspect of the invention, the digital convergence correction data are supplied to circuitry of the convergence apparatus at a varying data rate. The digital convergence correction data correspond to correction points located on the display screen. Separation of correction points in an edge portion of the display screen is smaller that separation of correction points in a center portion of the display screen.

BRIEF DESCRIPTION OF THE DRAWINGS

FIG. 3 is a diagram illustrating one embodiment of a memory map for one horizontal scan line in a correction data memory 113;

FIG. 4 is a diagram illustrating a second embodiment of a memory map in a correction data memory 113;

FIG. 5 is a diagram illustrating one example of address generation processing for a memory access in an address control circuit 112;

DETAILED DESCRIPTION OF THE INVENTION

First, a brief introduction of various features of the present invention is presented. This is followed by a more detailed discussion of examples of particular illustrative embodiments of the various aspects of the invention.

In one embodiment, a display device for a projection-type television receiver is characterized in that an interval between correction points in proximity to an edge of a display range in a horizontal scan line is narrowed as compared with an interval between correction points in a central portion of the display range. In another embodiment of the invention, the foregoing display is used in a projection type television.

To be more specific, in a placement form in which each correction point is placed at each position corresponding to division of a horizontal scan line into n equal parts, a new correction point is added to a portion between a correction point placed in the display range of the horizontal scan line and a correction point placed in a blanking period adjacent to the display range, whereby an interval between correction points in proximity to a boundary between the display range and the blanking period (that is, in proximity to the right and left edges of the screen) is kept closer than that in the other portions.

In addition, the correction points placed in the display range and the newly added correction points are adjusting points, of which correction data can be adjusted from outside (it is possible to set the correction data arbitrarily by manual adjustment). The correction points placed in the blanking period are interpolation points, of which correction data is determined by extrapolation operation using the correction data of the adjusting points.

With this configuration, the number (density) of correction points in proximity to the right and left edges of the screen is increased locally. Therefore, it is possible to generate a good correction waveform of convergence in proximity to the right and left edges of the screen without greatly increasing the total number (n) of the correction points in one horizontal scan line (for example, doubling the total number). Thus, according to embodiments of the present invention, the accuracy of the convergence correction at the right and left edges of the screen can be improved without great increase in labor at the time of the manual adjustment, required size of a circuit, and memory capacity.

Figure 1:
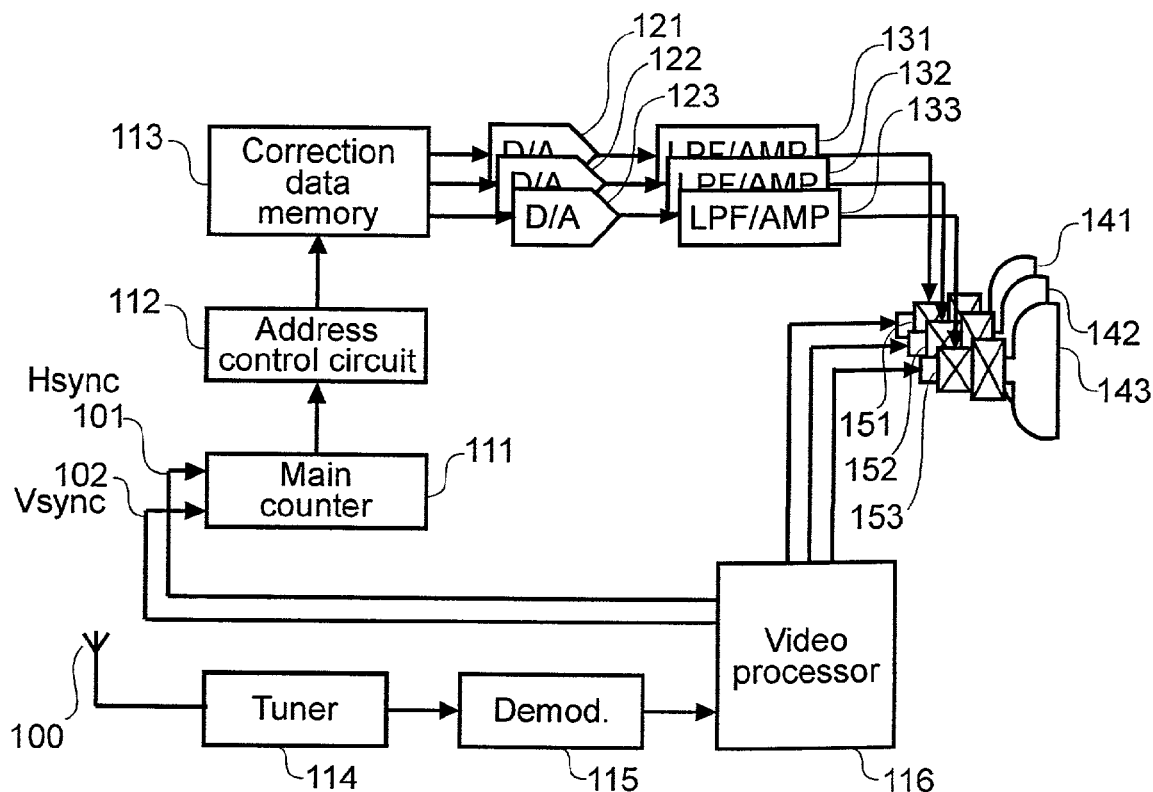
FIG. 1 is a block diagram of a digital convergence correction circuit according to a first embodiment of the present invention.

Hereinafter, illustrative embodiments of the present invention will be described with reference to drawings. FIG. 1 is a block diagram illustrating an embodiment of a digital convergence correction circuit that is used in a color display device according to an embodiment of the present invention. A horizontal synchronizing signal inputted into a 10 horizontal-synchronizing-signal input terminal 101, and a vertical synchronizing signal inputted into a vertical-synchronizing-signal input terminal 102, are supplied to a main counter 111. The main counter 111 is reset by the horizontal synchronizing signal and the vertical synchronizing signal, and it is so devised that the main counter 111 supports counting-up operation for at least one vertical-scanning period. In addition, after a clock generator (not shown in FIG. 1) outputs a clock signal of which a period is shorter than that of the horizontal synchronizing signal, the main counter 111 inputs the clock signal, and counts the clock signal during a horizontal scanning period (one period of the horizontal synchronizing signal). A count value, which is an output signal from the main counter 111, is supplied to an address control circuit 112 and serves as a basis for producing an address. Then, the count value is converted into an address signal for memory access, which is used for reading correction data stored in a correction data memory 113.

The correction data memory 113 stores correction data of convergence for each signal of three primary colors R, G, and B. The correction data of convergence corresponds to each of a plurality of correction points provided in one horizontal scan line at given intervals (in the present invention, the intervals are not regular). Digital correction data stored in this correction data memory 113 is read in sequence by the address control circuit 112 in response to electron-beam scanning. The digital correction data corresponding to each of the primary color signals of R, G, and B, which has been read from the correction data memory 113, is supplied to D/A converters 121, 122, 123 respectively, and then is converted into an analog signal. Each of the analog signals of R, G, and B, which have been output from the D/A converters 121, 122, 123, is supplied to LPF/AMP circuits 131, 132, 133 that have both functions of a low-pass filter and an amplifier. As noted above, the memory location spacing between the digital correction data varies. The data rate at which the digital correction data is supplied to the D/A converters 121, 122, 123 will likewise vary, as will be explained below.

In the first place, the LPF/AMP circuits 131, 132, 133 smooth the analog signals from the D/A converters 121, 122, 123 using the low-pass filter function to generate a convergence correction waveform. Next, using the amplification function, the LPF/AMP circuits 131, 132, 133 amplify the correction waveform, and then generate CY current for driving convergence yokes (CY) 151, 152, 153, which are mounted on neck portions of CRTs 141, 142, 143 for displaying video corresponding to each of the primary color signals of R, G, and B. The convergence yokes (CY) 151, 152, 153 are provided for each of the primary color signals of R, G, and B respectively. The convergence yokes (CY) 151, 152, 153 locally control (adjust) scanning of each electron beam (R, G, and B), which is scanned by a deflection yoke (not shown in FIG. 1), in order to generate correction magnetic field, which is used for the convergence correction, in the CRTs 141, 142, 143. As a result, the convergence correction is performed independently for each of the primary color signals of R, G, and B.

This embodiment is characterized by a placement form of correction points for one horizontal scan line. To be more specific, correction points are conventionally placed at points, which correspond to division of one horizontal scan line into n equal parts; however, in this embodiment, an interval between the correction points, which are placed in proximity to edges of a display range in one horizontal scan line (in proximity to a boundary between the display range and a blanking period), is narrowed as compared with an interval between compensation points that are placed in a central portion of the display range. Details will be described with reference to FIGS. 2 and 3 below. By the way, the following exemplifies a case where convergence correction processing is performed for high-definition video signal having a horizontal scanning frequency of fH=33.75 kHz and a vertical scanning frequency of fV=60 Hz.

FIG. 1 also shows additional components which comprise a receiver component, illustrating the incorporation of the color display device in a projection-type television system. These additional components are conventional and known. Consequently, only a brief discussion is needed. A signal receiving element 100 (e.g., an antenna) for receiving a television signal. The receiving element 100 is coupled to a tuner 114, for tuning to a channel which a user desires, and outputting a television signal of the desired channel. A demodulator 115 receives an output signal from the tuner. The demodulator 115 demodulates the output signal and produces a demodulated signal. The demodulated signal is fed to a video processor 116. The video processor 116 acts as a predetermined signal process to the output signal from demodulator 115 and generates three primary color signals (R, G, B signals). The three primary color signals are provided to the red, green, and blue CRTs 141, 142, and 143 respectively. The CRTs 141, 142, and 143 are driven based upon the three primary color signals respectively. The video processor 116 also produces corresponding horizontal and vertical synchronizing signals which are fed to terminals 101 and 102 respectively.

Figure 2:
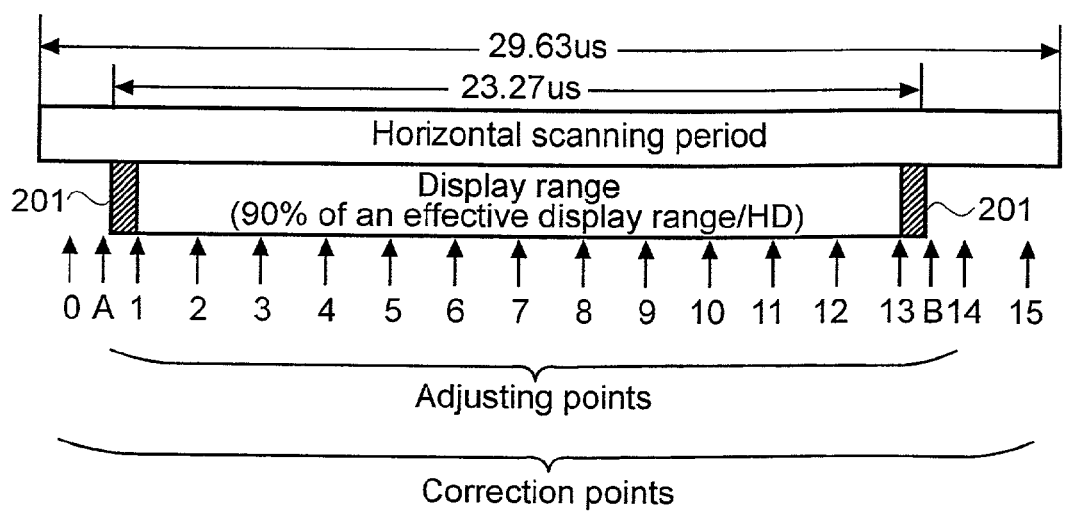
FIG. 2 is a diagram illustrating a placement form of correction points in a horizontal scan line during a horizontal scanning period according to embodiments of the present invention.

FIG. 2 shows an example of a placement form of correction points. The placement form is used as a reference of the convergence correction. If the digital convergence correction circuit is applied to the above-mentioned high-definition video signal, in this embodiment in FIG. 2, the correction points are placed at 16 points corresponding to division of one horizontal scan line of the video signal into 16 equal parts (more specifically, n=16). More specifically, 13 points among these 16 points (that is, m=13, corresponding to 1 through 13 in FIG. 2) are placed in a display range (video display portion), while three remaining points (corresponding to 0, 14, and 15 in FIG. 2) are placed in a blanking period that is adjacent to the display range. Moreover, new correction points (corresponding to A and B in FIG. 2) are added to periods having no correction point, each of which exists between a correction point placed in the display range and a correction point placed in the blanking period. It should be readily apparent to one of ordinary skill that the number n of correction points can be some number other than 16. Similarly, the number m of points located in the display range can be other than 13. Also, the number of new correction points is not limited to two. The specific numbers selected depend on system/device cost considerations, performance criteria, and in general to factors not relevant to the practice of the invention.

The correction points placed in the display range and in proximity to its edges (1 through 13, A, and B in FIG. 2) are called "adjusting point" because correction data corresponding to the correction points can be adjusted arbitrarily from outside at the time of manual convergence adjustment. Furthermore, the correction points 1 through 13 in FIG. 2 are called "a first adjusting point" and the correction points A and B in FIG. 2 are called "a second adjusting point". Additionally, the correction points placed in the blanking period (0, 14, and 15 in FIG. 2) are called "interpolation point" because the correction data corresponding to the correction points are determined by extrapolation operation using correction data corresponding to the first adjusting points and the second adjusting points (it is not possible to adjust the correction points arbitrarily from outside). In addition, each of the second adjusting points is placed at a middle position of a period that is adjacent to the first adjusting point and the interpolation point (that is to say, a position that divides a period between the first adjusting point and the interpolation point into 1:1).

Thus, in this embodiment, by newly adding each of the second adjusting points to the position in proximity to each edge of the display range, the interval between the second adjusting point and the first adjusting point adjacent to it, and the interval between the second adjusting point and the interpolation point adjacent to it, become narrower (closer) than the interval between the first adjusting points in the central portion of the display range. As will be explained, by varying the memory location spacing the data rate at which the digital correction values are supplied to the D/A converter will vary.

As regards a high-definition video signal of fH=33.75 kHz and fV=60 Hz, a horizontal scanning period is 29.63 µs, and an effective display range is 25.86 µs. In addition, as a projection-type television receiver that is generally used, it is required that at least about 90% of the effective display range can be displayed on a screen. Therefore, it is necessary to cover at least a period of 23.27 µs, which is equivalent to 90% of the effective display range, by the adjusting points of which values can be set arbitrarily. By adding the second adjusting points A and B to the right and left edges of the display range (in this embodiment, each of the second adjusting points A and B is placed at a position a little outside of each edge of the display range), the digital convergence correction circuit according to this embodiment can cover the correction data for the whole period of 23.27 µs as adjusting points of which value can be set arbitrarily from outside.

Figure 11:
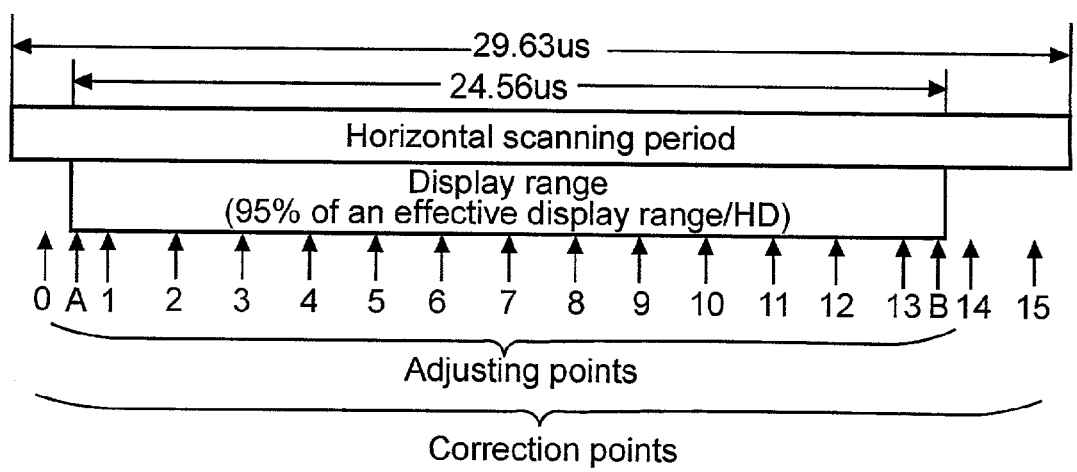
FIG. 11 shows a diagram illustrating another placement form of correction points.

Thus, in this embodiment, it is so devised that the number (density) of correction points in proximity to each edge of the display range becomes larger than that in the central portion of the display range. Because of it, it is possible to form a correction waveform in proximity to each of the edges more precisely. Therefore, even in a range of numeral 201 in FIG. 2 that conventionally caused convergence displacement, it is possible to eliminate the convergence displacement. This results in improvement in accuracy of the convergence correction around the perimeter of the screen. What is more, the number of adjusting points, of which value is set by the manual adjustment, is 15 in the digital convergence correction circuit whereas the conventional points are 13. This means that only two points are increased. Therefore, there will be little increase in labor required at the time of manual adjustment. Incidentally, although FIG. 2 shows an example in which the second adjusting points A and B are placed outside the display range, the second adjusting points A and B can be placed within the display range as a matter of course (see, for example, FIG. 11). In this case, it is desirable that an interval between an edge of the display range and the second adjusting point does not become too large.

The convergence correction data for 18 points in total, which includes the first adjusting points, the interpolation points, and the second adjusting points, are prepared in the correction data memory 113 beforehand. FIG. 3 shows a first embodiment related to a memory map corresponding to one horizontal scan line in the correction data memory 113. In the memory map shown in FIG. 3, the digital correction data is stored in the correction data memory 113 while keeping positional relationships among the first adjusting point, the interpolation point, and the second adjusting point in correspondence with a horizontal scan line. In addition, as can be seen, the memory location spacing between pairs of adjacent correction data vary. Some pairs of adjacent correction data are separated by zero memory locations (e.g., data at locations 00h and 01h). Other pairs of adjacent correction data are separated by one memory location (e.g., data at locations 02h and 03h). To be more specific, for the embodiment shown in FIG. 3, as compared with a difference in address value between the first adjusting points adjacent to each other, which are selected from the first adjusting points 1 through 13, a difference in address value between the first adjusting point 1 and the second adjusting point A (a difference in address value between the first adjusting point 13 and the second adjusting point B) and a difference in address value between the second adjusting point A and the interpolation point 0 (a difference between the second adjusting point B and the interpolation point 14) are decreased. Generally, the memory location spacing between adjacent correction data may be zero or more memory locations. This enables easy generation of an address signal for an access to the correction data memory 113 in the address control circuit 112. More specifically, using a horizontal synchronizing signal and a vertical synchronizing signal, which are inputted from the input terminals 101 and 102, respectively, the operation of the main counter 111 is reset. Then, an output of the main counter 111, which is counted up one by one (in response to a clock for example, not shown), is used as is as an address signal for memory access. However, in this case, as shown in FIG. 3, required memory capacity is twice as much as the conventional method. Moreover, unused areas (empty memory locations) or useless areas are created in the memory.

In the particular embodiment of FIG. 3, the addresses from the address control circuit 112 are produced at a constant rate, depending for example on the frequency of the clock driving the main counter 111. Correction data which occupy adjacent memory locations (e.g., 00h, 01h, and 02h) will be read out at a data rate, R1; e.g., one datum per clock. The memory configuration shown in FIG. 3 shows some empty memory locations, e.g., 03h, 05h, etc. When these empty memory locations are "read out", the memory hardware is configured so that the data lines feeding into the D/A converters 121, 122, 123 do not change their data state and so effectively no data is supplied to the D/A converters. Consequently, correction data which occupy non-adjacent memory locations (e.g., 04h through 12h) will be read out at a data rate, R2, greater than data rate R1; e.g., one datum every other clock.

FIG. 4 shows a second embodiment related to a memory map (for one horizontal scan line) in the correction data memory 113. As regards a memory map shown in FIG. 4, the convergence correction data is stored in the first storage area of the correction data memory 113 (an area indicated by addresses 00h through 0Fh in FIG. 4) while keeping only positional relations of the first adjusting point and the interpolation point in the horizontal scan line. In addition, the second storage area (an area indicated by addresses 10h and 11h in FIG. 4) is reserved for convergence correction data of the second adjusting point. Using such a memory map permits memory capacity to be reduced to a required minimum. As compared with the conventional method, an increase in quantity is little. However, in this case, it is required to generate an address signal, which adapts to the memory map shown in FIG. 4, using the address control circuit 112. For example, when scanning of a horizontal electron beam comes near to a left edge of a screen (display starting position), an address 10h is accessed immediately before jumping to an address 01h to read addresses 01h through 0Dh in sequence. Then, when scanning of the electron beam reaches a right edge of the screen (display end position), an address signal for accessing an address 11h may be generated. Details will be described with reference to FIG. 5 below.

FIG. 5 shows an example of address signal generation processing for the memory access in the address control circuit 112. This example is applied to a case where a memory map of the correction data memory 113 has a form as shown in FIG. 4. The main counter 111 counts pulses of a clock signal, of which a period is shorter than that of an input horizontal synchronizing signal, over one horizontal scan line. Then, the main counter 111 outputs a count signal as shown by numeral 501 to the address control circuit 112. After that, the address control circuit 112 converts the count signal 501, which has been output from the main counter 111, into an address signal for memory access as shown in numeral 502, and then outputs the address signal. As regards address generation processing in the address control circuit 112 shown in FIG. 5, for example, if the address control circuit 112 detects "01h" and "1Bh" of an output signal from the main counter 111, addresses "10h" and "11h" are output. In other cases, the output signal from the main counter 111 excluding a least significant bit is used as it is as an address signal for memory access.

As can be seen if FIG. 5, the addresses 502 produced by the address control circuit includes a sequence in which an address is produced at every other clock cycle (e.g., the addresses 02h, 03h, 04h, 05h are output by the address control circuit with every other count signal 501), while the sequence of addresses 00h, 10h, and 01h is produced at each count signal. Thus, in the embodiment shown in FIG. 4, the rate at which the addresses are produced varies; in one case an address is produced at every other clock, while in another case an address is produced at every clock. In the memory configuration of FIG. 3, the digital correction data stored in the correction data memory 113 is supplied to the D/A converters 121, 122, 123 at a varying rate because the rate at which the digital correction data is read out varies. In the case of the memory configuration shown in FIG. 4, the digital correction data rate supplied to the D/A converters varies because the address generation rate varies.

The convergence correction data for R, G, and B signals, which have been read from the correction data memory 113 by the above-mentioned processing, is converted into analogue signals in the D/A converters 121, 122, 123 respectively. After that, in the LPF/AMPs 131, 132, 133, smoothing processing of the convergence correction signal and conversion processing to CY current waveforms are performed for the analog signals respectively. Then, the analogue signals drive the CY 151, 152, 153 that are mounted on neck portions of the CRTs 141, 142, 143. The convergence correction is performed by such an operation.

As described above, even for a video signal of which flyback time is short, such as a high-definition video signal, which conventionally caused convergence displacement at the right and left edges of the screen, it is possible to reduce the convergence displacement at the right and left edges of the screen by using the digital convergence correction circuit disclosed herein. In addition, it is possible to reduce the convergence displacement while suppressing increase in the digital memory capacity and increase in labor at the time of the adjustment of the convergence correction data as much as possible.

Figure 6:
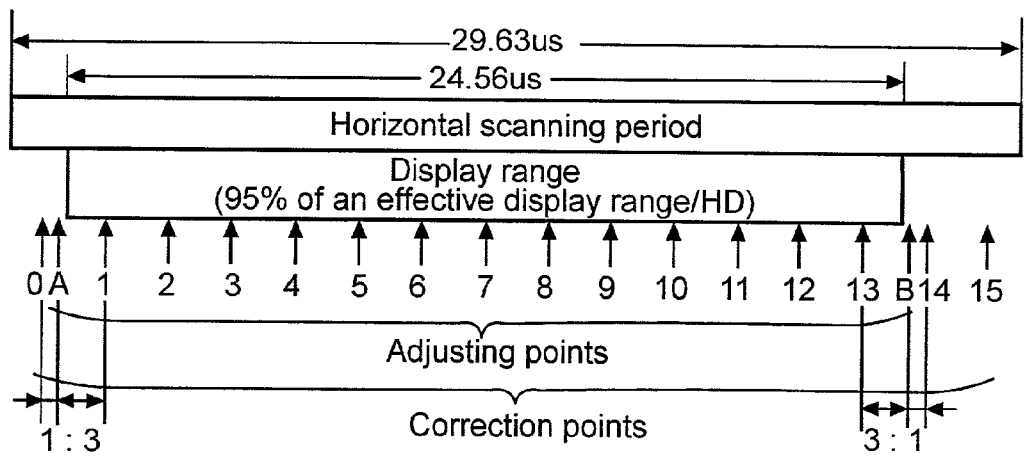
FIG. 6 is used for explaining a second embodiment according to the present invention, and is a diagram illustrating a placement form of correction points, which is different from the placement form shown in FIG. 2.
Figure 7:
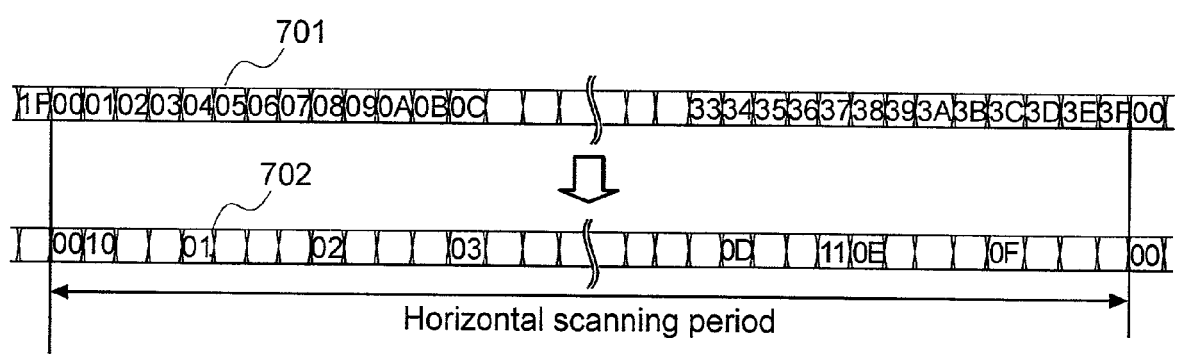
FIG. 7 is a diagram illustrating another example of address generation processing for a memory access in an address control circuit 112.

Next, a second embodiment of a digital convergence correction circuit, which is used for a projection-type television receiver will be described with reference to FIGS. 6 and 7. In the second embodiment, a case where convergence correction processing is performed for a high-definition video signal of fH=33.75 kHz and fV=60 Hz, and a case where it is necessary to display at least about 95% of the above-mentioned effective display range on the screen, will be described. Also in this embodiment, as is the case with the first embodiment, from among 16 points (n=16) that correspond to division of one horizontal scan line of a video signal into 16 equal parts, 13 points (m=13) are configured as first adjusting points (1 through 13 in FIG. 6) of which value can be set arbitrarily from outside. In addition, three remaining points are configured as interpolation points (0, 14, and 15 in FIG. 6) of which correction data is determined by extrapolation operation (it is not possible to set the correction data from outside). Difference between this second embodiment and the first embodiment is the placement positions of second adjusting points (A and B in FIG. 6). In this embodiment, as shown in FIG. 6, each of the positions of the second adjusting points (A and B in FIG. 6) is configured as a position that divides the period the first adjusting point and the interpolation point are adjacent to each other into 3:1. Therefore, by configuring the positions of the second adjusting points in this manner, it becomes possible to cover the period of 24.56 μs using the adjusting points of which value can be set arbitrarily even in the case of a high-definition video signal of fH=33.75 kHz and fV=60 Hz, and even in the case where it is necessary to display at least about 95% of an effective display range on the screen, as shown in this embodiment.

In this second embodiment, the memory map shown in FIG. 4 can also be used as a memory map of the correction data memory 113. An embodiment of generation of an address signal for memory access in this case will be described with reference to FIG. 7. The main counter 111 is configured to count pulses of a clock signal, of which period is shorter than that of the input horizontal synchronizing signal, over one horizontal scan line. For example, as shown at numeral 701 in FIG. 7, the main counter 111 is configured to perform counting-up operation from "0h" to "3Fh". In address signal generation processing in the address control circuit 112, as shown at numeral 702 in FIG. 7, for example, if "01h" and "37h" of an output signal from the main counter 111 are detected, addresses "10h" and "11h" are output. In other cases, the output signal of the main counter 111 excluding a least significant bit and a second least significant bit may be used as it is as an address for an access to the correction data memory 113. The same effects as those of the first embodiment can also be achieved in this embodiment.

In the first and the second embodiments, each of the positions of the second adjusting points is configured as a position that divides the period the first adjusting point and the interpolation point are adjacent to each other into 1:1 (that is to say, a middle position), and as a position that divides the period into 3:1; however, the above-mentioned positions are only examples. It is needless to say that the second adjusting point can be configured as an arbitrary position in the period the first adjusting point and the interpolation point are adjacent to each other by associating settings of counting-up operation of the main counter 111 with the address generation processing in the address control circuit 112. However, if a fact that the main counter 111 and the address control circuit 112 are digital circuits is taken into consideration, it is desirable that the second adjusting point is placed at one point among X−1 points by which the period adjacent to both of the first adjusting point and the interpolation point is divided into X equal parts (in this case, X is the power of 2).

Figure 8:
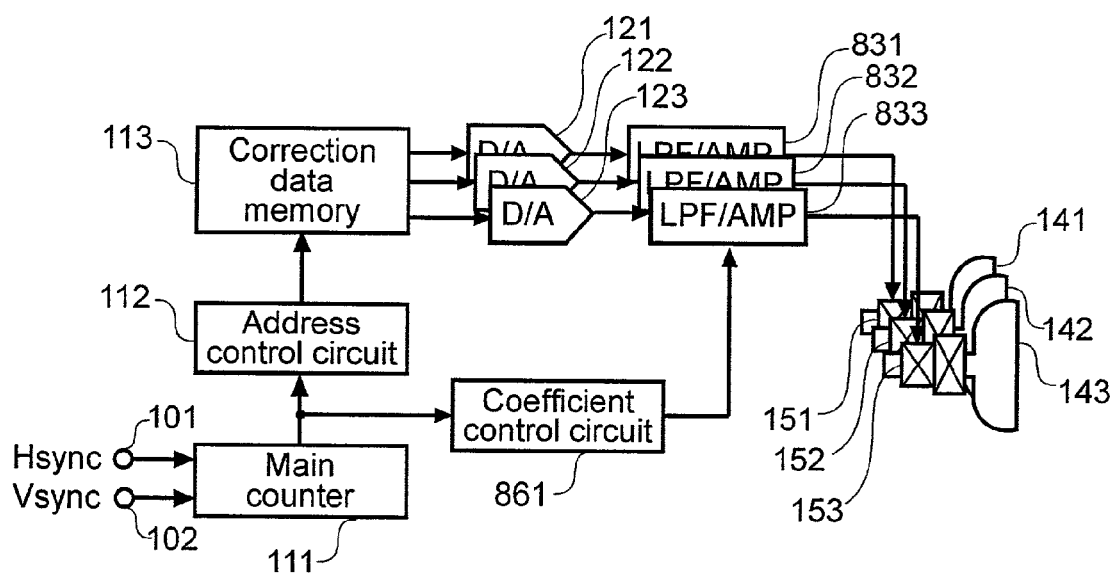
FIG. 8 is a block diagram illustrating a third embodiment according to the present invention.
Figure 9:
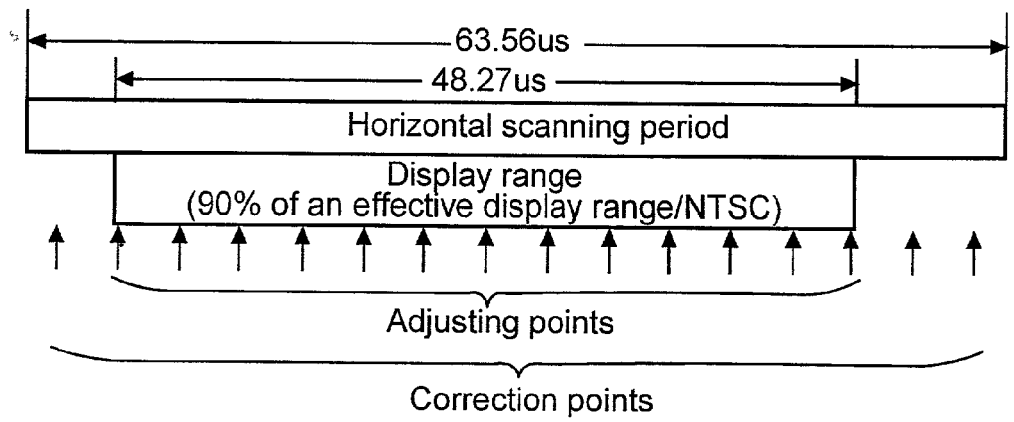
FIG. 9 is a diagram illustrating a placement form of correction points in a horizontal scan line at the time of convergence for a NTSC signal.
Figure 10:
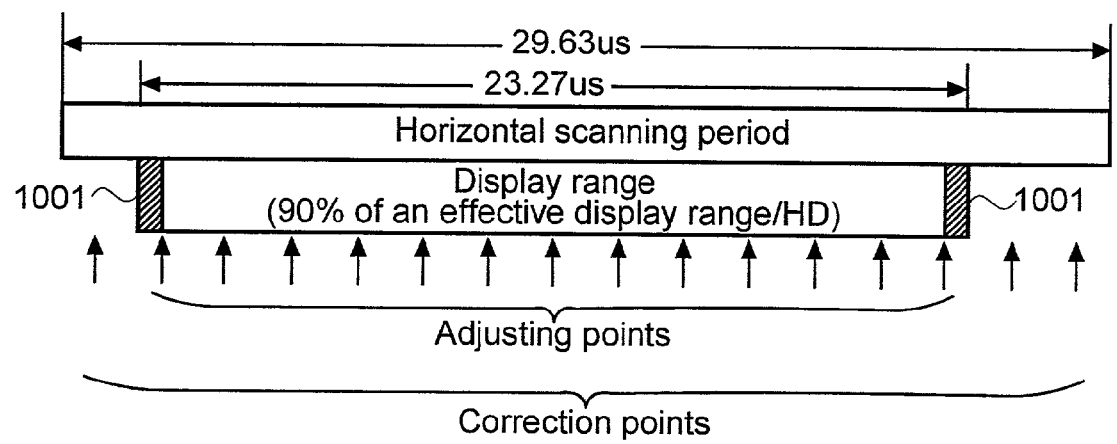
FIG. 10 is a diagram illustrating a placement form of correction points in a horizontal scan line at the time of convergence for a high-definition video signal.

Next, a third embodiment of a digital convergence correction circuit, which is used for a projection-type television receiver will be described with reference to FIG. 8. In a block diagram shown in FIG. 8, components having the same numbers as FIG. 1 operate in the same manner as those shown in FIG. 1. Therefore, description of the components will be omitted. A difference between this third embodiment and the first embodiment shown in FIG. 1 is that different LPF/AMPs 831, 832, 833, of which a filter coefficient is configured to be switchable, are provided taking the place of LPF/AMPs 131, 132, 133 shown in FIG. 1, and that a coefficient control circuit, which controls the filter coefficient of the LPF/AMPs 831, 832, 833 in response to an output signal of the main counter 111, is newly provided.

Also in the third embodiment, as described in the first and the second embodiments, as shown in FIG. 2 for example, preparing the second adjusting point in addition to the first adjusting point and the interpolation point enables prevention of convergence displacement at the right and left edges of the screen. Therefore, only in the proximity of the second adjusting point, output density of convergence correction data becomes high as compared with the other portions. In such a case, as regards LPF portions of the LPF/AMPs 831, 832, 833 that are connected to the rearward of the A/D converters 121, 122, 123 respectively, it may be desirable that one or more parameters (e.g., the filter coefficient) of the LPF for a case where signal smoothing is performed for an analog signal of correction data in proximity to the second adjusting points has a value(s) different from that for a case where signal smoothing is performed for an analog signal of correction data in the other positions. In this embodiment, the filter coefficients of the LPF/AMPs 831, 832, 833 are controlled by the coefficient control circuit 861 that refers to a value of the main counter 111, and that judges whether or not the correction data memory 113 outputs correction data in proximity to the second adjusting points. For example, when the correction data memory 113 outputs correction data in proximity to the second adjusting points (to be more specific, in proximity to locations of both edges of the display range where the density of the correction data is high), the filter coefficient (time constant of the filter) is decreased to thereby increase response speed of the LPF. On the other hand, when the other correction data is output (to be more specific, a central portion of a display range and a blanking period where density of correction data is low), the filter coefficient is increased to thereby slow down a response speed of the filter. As a result, the digital convergence correction circuit according to this embodiment can perform successful smoothing operation over the whole horizontal scan line, whereby an appropriate convergence correction waveform can be obtained.

In addition, although it is not shown in the figure, instead of controlling the filter coefficient in the LPF portion of the LPF/AMP, in the period the first adjusting points are adjacent to each other, and in the period the interpolation points are adjacent to each other, data generated by interpolation operation using correction data in close proximity thereto may be outputted as convergence correction data. As a result, the output density of the correction data in proximity to the second adjusting point and in the other portions can be kept almost constant. In this case, the effects described in the first, the second, and the third embodiments can also be achieved likewise.

In the description above, the case where the convergence correction processing is performed for the high-definition video signal of the horizontal scanning frequency fH=33.75 kHz and vertical scanning frequency fV=60 Hz has been described as an example. However, it is needless to say that the convergence correction for a NTSC signal of the horizontal scanning frequency fH=15.75 kHz and the vertical scanning frequency fV=60 Hz, and for a video signal having other formats, can also be performed likewise. It is natural that the same effects as those described above can also be obtained even in this case. Moreover, as regards the number of the second adjusting points that are inserted between the first adjusting point and the interpolation point, only one point is placed at each of the right and left edges in the display portion in the first, the second, and the third embodiments. It should be readily apparent to one of ordinary skill that the specific number of first adjusting points is not relevant to the practice of the invention. Similarly, the number second adjusting points is not relevant to the practice of the invention. Also, the present invention does not require or impose a limit on the number of new correction points. The specific numbers selected depend on system/device cost considerations, performance criteria, and in general to factors not relevant to the practice of the invention.

According to embodiments of the present invention, accuracy of convergence correction at the right and left edges of a screen can be improved. In addition, it is possible to improve the accuracy of convergence correction while suppressing increase in memory capacity and increase in labor at the time of adjustment of convergence correction data. Variations and modifications of the disclosed illustrative embodiments of the present invention will no doubt suggest themselves to those skilled in the relevant arts. Accordingly, the foregoing discussions should be considered as illustrative and not in a limiting sense.

What is claimed is:

1. A color projection-type display system having a convergence correction signal generation component comprising:
   an analog signal generator which generates said convergence correction signal, said analog signal generator having an input portion for receiving digital convergence correction data; and
   a memory coupled to supply digital data to said analog signal generator,
   said memory configured with convergence correction data for a high definition video signal which has a blanking period shorter than that of a NTSC signal, said convergence correction data corresponding to correction points along a horizontal scan line,
   said convergence correction data including additional correction points which are set in proximity to an edge portion of a display area in said horizontal scan line, the number of correction points in said convergence correction data being greater than the number of correction points in convergence correction data for said NTSC signal,
   wherein correction points including additional correction points proximate said edge portion of said display area have smaller separation than corrections points in a central portion of said display area, said convergence correction data being used for convergence correction of the displayed high definition video signal.

2. The convergence correction signal component of claim 1 wherein said analog signal generator includes a low-pass filter for producing said convergence correction signal and a filter parameter selection circuit for selectively adjusting a parameter of said low-pass filter depending on said convergence correction data.

3. A color projection-type television system including a convergence correction signal generating apparatus for correcting convergence in a display area of said television system, said convergence correction signal generating apparatus comprising:
   a memory configured with convergence correction data for a high definition video signal which has a blanking period shorter than that of a NTSC signal;
   an address generation circuit operatively coupled to said memory to access said convergence correction data; and
   an analog signal generation circuit coupled to said memory to receive said convergence correction data from said memory and operable to produce said convergence correction signal from said convergence correction data,
   said convergence correction data corresponding to correction points alone a horizontal scan line and including additional correction points which are set in proximity to an edge portion of a display area in said horizontal scan line, the number of correction points in said convergence correction data being greater than the number of correction points in convergence correction data for said NTSC signal,
   wherein separation between correction points located in a central portion of said display area is greater than separation between correction points including additional correction points located in said edge portion, said convergence correction data being used for convergence correction of the displayed high definition video signal.

4. The apparatus of claim 3 wherein said convergence correction data is stored in said memory such that a first pair of adjacent convergence correction data is separated by zero or more empty memory locations and a second pair of adjacent convergence correction data is separated by zero or more empty memory locations, said first pair of adjacent convergence correction data have a memory location spacing different from said second pair of adjacent convergence correction data.

* * * * *